United States Patent
Ekambaram et al.

(10) Patent No.: US 10,304,348 B2
(45) Date of Patent: May 28, 2019

(54) SYSTEM, METHOD AND COMPUTER PROGRAM PRODUCT FOR PACKING

(71) Applicant: International Business Machines Corporation, Armonk, NY (US)

(72) Inventors: Vijay Ekambaram, Tamilnadu (IN); Ashish Rakeshkumar Mittal, Bangalore (IN); Ruhi Sharma Mittal, Bangalore (IN); Yedendra Babu Shrinivasan, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 168 days.

(21) Appl. No.: 15/244,173

(22) Filed: Aug. 23, 2016

(65) Prior Publication Data
US 2018/0061255 A1 Mar. 1, 2018

(51) Int. Cl.
| | |
|---|---|
| G09B 5/02 | (2006.01) |
| G09B 5/12 | (2006.01) |
| G06T 19/00 | (2011.01) |
| G06F 16/26 | (2019.01) |
| G06F 16/44 | (2019.01) |
| G06F 16/438 | (2019.01) |

(52) U.S. Cl.
CPC ............... *G09B 5/02* (2013.01); *G06F 16/26* (2019.01); *G06F 16/4393* (2019.01); *G06F 16/44* (2019.01); *G06T 19/006* (2013.01); *G09B 5/125* (2013.01)

(58) Field of Classification Search
None
See application file for complete search history.

(56) References Cited

U.S. PATENT DOCUMENTS

| | | | | |
|---|---|---|---|---|
| 2003/0083763 A1* | 5/2003 | Kiyohara | ............ | G06Q 10/087 |
| | | | | 700/97 |
| 2009/0222354 A1* | 9/2009 | Murphy | ............... | G06Q 10/087 |
| | | | | 705/21 |
| 2014/0279288 A1* | 9/2014 | Wouk | ................. | G06Q 30/0643 |
| | | | | 705/27.2 |

(Continued)

OTHER PUBLICATIONS

Heathrow Airport, How to: Pack Like a Pro, Youtube video, Mar. 6, 2012, https://www.youtube.com/watch?v=Llk8v__Osm8.*

(Continued)

*Primary Examiner* — Jason T Yen
(74) *Attorney, Agent, or Firm* — Rahan Uddin, Esq.; McGinn IP Law Group, PLLC

(57) ABSTRACT

A computer-implemented wardrobe packing method, system, and a computer program product, include selecting a plurality of items stored in a memory to pack into a container, generating a packing order of the plurality of items based on packing preference data and item data stored in the memory, creating and displaying a video of step-by-step packing instructions for the plurality of items in the packing order, monitoring and comparing an actual packing process to a generated packing order, and controlling said displaying of step of the step-by-step packing instructions, in response to said monitoring and comparing.

20 Claims, 6 Drawing Sheets

(56) References Cited

U.S. PATENT DOCUMENTS

2015/0221021 A1* 8/2015 Shakes .................. G06Q 10/08
 705/26.81
2016/0314704 A1* 10/2016 Bell ........................ G09B 5/02
2017/0352282 A1* 12/2017 Anderson ................ G09B 5/02

OTHER PUBLICATIONS

Mel, et al. "The NIST Definition of Cloud Computing". Recommendations of the National Institute of Standards and Technology. Nov. 16, 2015.

* cited by examiner

SYSTEM, METHOD AND COMPUTER PROGRAM PRODUCT FOR PACKING

BACKGROUND

The present invention relates generally to packing of items, and more particularly, but not by way of limitation, to a system, method, and computer program product for creating an interactive, augmented video depicting an optimized packing order of wardrobe items.

Often, people conduct packing at the last minute, which leads to stress. In the last minutes of packing before a trip, people rush around grabbing clothes even if they are not coordinated, or even forget something important to pack.

Conventional packing strategies follow a set of rules based on the type of item independently from all of the other items being packed. For example, packing to the minimum dimension of each item is not always the best way of packing because each content has some preferences to pack. For example, blazers, coats, or shirts should be crease or wrinkle free. Therefore, folding blazers or coats are not the best way to pack because packing to the minimum dimensions leads to creases on the clothes.

Thus, the needs in the art include a wardrobe packing technique that considers a packing preferences for each item individually to optimize the packing space factoring in the packing preferences.

SUMMARY

In an exemplary embodiment, the present invention can provide a computer-implemented packing method, the method including selecting a plurality of items stored in a memory to pack into a container, generating a packing order of the plurality of items based on packing preference data and item data stored in the memory, creating and displaying a video of step-by-step packing instructions for the plurality of items in the packing order, monitoring and comparing an actual packing process to a generated packing order, and controlling said displaying of step of the step-by-step packing instructions, in response to said monitoring and comparing.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
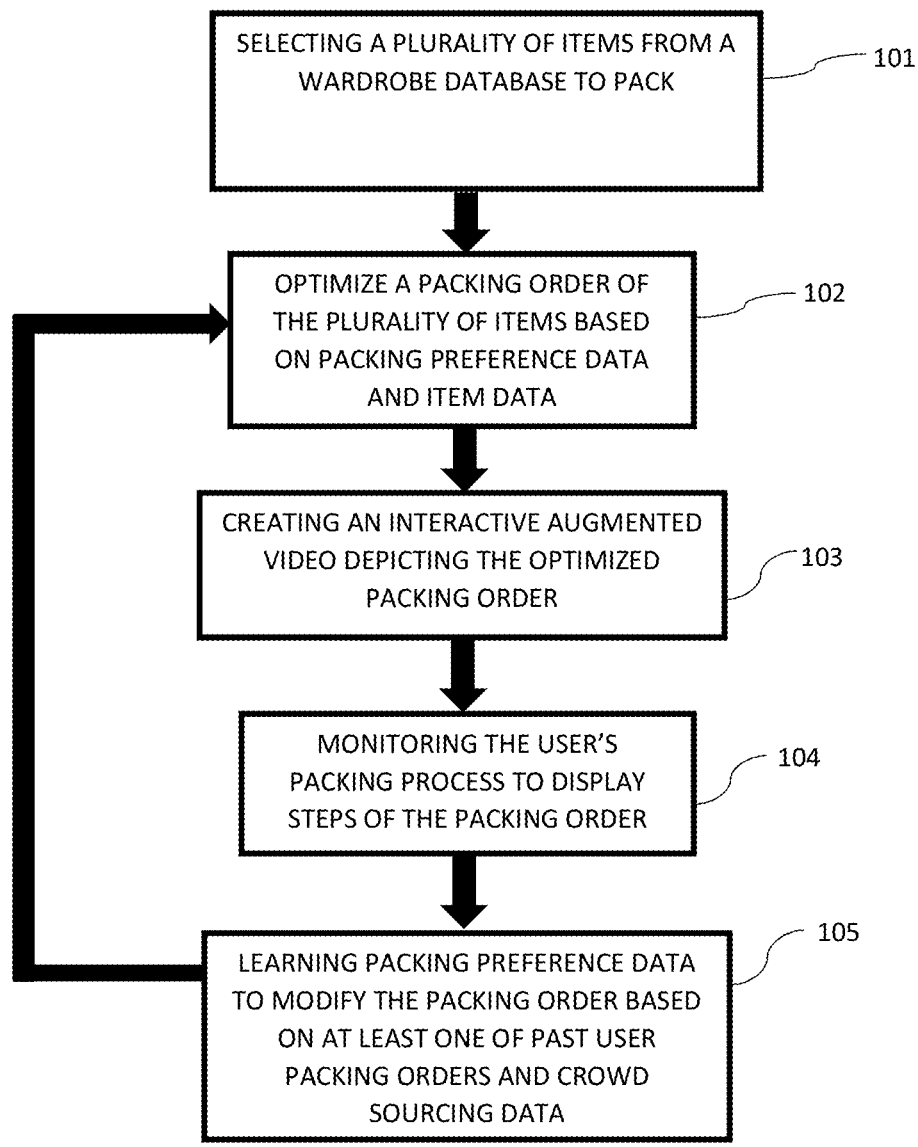
FIG. 1 depicts a high-level flow chart for a wardrobe packing method according to an embodiment of the present invention.

The invention will now be described with reference to FIG. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, a wardrobe packing method 100 according to an embodiment of the present invention includes various steps to optimize a packing order of items in order to create an interactive augmented video while monitoring the users' packing process to display steps of the optimized packing order. As shown in at least FIG. 4, one or more computers of a computer system 12 according to an embodiment of the present invention can include a memory 28 having instructions stored in a storage system to perform one or more embodiments of the present invention.

Wardrobe packing in accordance with some embodiments of the present invention may give the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 4-6) may be implemented in a cloud environment 50 (see e.g., FIG. 5), it is nonetheless understood that the present invention can be implemented outside of the cloud environment.

Referring again to the example depicted in FIG. 1, in step 101, a plurality of items from a wardrobe database to pack are selected.

The wardrobe database comprises a list of all of the items of the user that the user may wish to pack. The wardrobe database can be manually updated by scanning a Radio-Frequency Identification (RFID) of the item when the user wants to enter an item into the wardrobe database. Preferably, the digital wardrobe can be linked to, for example, a shopping application such as an online website shopping cart, e-mail, etc. or a payment method. In this manner, the item is added to the digital wardrobe when the item is purchased or payment is made.

Further, the digital wardrobe can be embodied as an application that the user can view each item, edit user preferences for each item, and mark each item with characteristics. Preferably, the wardrobe database is embodied as an online view of everything that a user owns. In the wardrobe database, each item is associated with its dimensions, a type of the item, a weight of the item, etc. (e.g., item data) and packing preferences for the item (e.g., packing preference data).

For example, the item data comprises dimensions which includes a length, a breadth, and a height of the content, a type of the item which includes a category of the content such as whether it is a top, shirt, bottom, purse, shoes, etc., whether it is some fragile content like glass bottles, laptops, etc., whether the item is a luggage bag (e.g., a container) that the items will be packed in.

Packing preferences include, for example, preferences with which someone wants to consider while packing such as an item to be crease or wrinkle free, an item to be packed at the top or bottom of the luggage bag, etc.

It is noted that each item includes a default preference until the user updates the preference for the item. The default preferences can be determined based on, for example, crowd sourcing for preferences for the item.

In the wardrobe database, the items can be arranged according to the category of items, past trip history, past packing data, etc. Preferably, a recommended list is presented based on user preferences, and travel-related factors such as destination condition, destination activities, and travel mode. In step 101, the user can select the plurality of items that the user would like to pack. The user can also select a container (e.g., a luggage bag, suitcase, luggage, etc.) for packing. Preferably, a plurality of items can be presented to the user based on travel related factors and past user packing data and the user can edit the list accordingly.

Although the term "wardrobe" generally refers to clothing, it is noted that the wardrobe database further comprises all items that can be packed such as electronics, personal care items, hygiene items, etc.

In step 102, a packing order of the plurality of items that are selected in step 101 is optimized based on the packing preference data and item data. Step 102 finds a best way (e.g., optimal) of packing each item and its placement in the luggage bag taking other items and their packing preferences into consideration.

In one embodiment, if a number of items to pack is large and the user does not have packing preference data such as a crease of the items or a placement of the items such that the packing preference of the user is space-efficient packing, then a packing order to optimally use the space of the luggage bag is created in step 102. In other words, step 102 can optimize the packing order based on both the packing preference data (e.g., maximize space) and item data (e.g., how to arrange/fold each item to use a minimum amount of space).

In one embodiment, if a number of items to pack is moderate to large, and the packing preference data of some of the items is that item must be crease-free, then, the packing order can be optimized to partition the luggage bag into a portion for the items to optimize space and a portion for the items not to include creases (e.g., a left side of the luggage bag includes folded items in any manner to optimize space and the right side includes a stacked set of folded clothes to avoid creases). Therefore, step 102 can optimize the packing order based on a combination of packing preference data (e.g., maximize space and minimize creases) and item data (e.g., how to arrange/fold each item to use a minimum amount of space).

It is noted that the packing order can comprise a step-by-step instruction for packing each item including how to prepare each item (e.g., folding, wrapping, etc.) for the luggage bag as well as a placement of the item in the luggage bag. For example, the packing order includes a step-by-step instruction for each item on how to fold an item and where to place the item in the luggage bag. The packing order can further account for a weight of the items so as not to harm other items by placing heavier items on top.

In step 103, an interactive, augmented video depicting (e.g., visually showing) how to perform the optimized packing order is created. The interactive video comprises, for example, a montage of the step-by-step instructions for packing each item in order, according to the optimized packing order of step 102.

Each type of item can correspond to a pre-made instructional video segment on how to prepare the item to be placed into the luggage. The pre-made instruction video can comprise folding instructions, where to place the item in the luggage bag, etc. The interactive augmented video comprises each of the pre-made instructional video segments corresponding to the items in the packing order according to the order of the optimized packing order. That is, once step 102 optimizes the packing order of the plurality of items (e.g., finds out the best way to pack each item and its placement in the luggage bag), step 103 creates an interactive augmented video which shows the way of packing each content step by step.

The interactive augmented video can be displayed on any device comprising a display for playing the video and an image-capturing device for step 104 as described later. However, an external image-capturing device utilized with step 104 can be provided and connected to a display device for playing the video.

In step 104, the users' packing process is monitored via the image-capturing device to display a step of the packing order in the interactive augmented video based on the item that the user is currently packing. In other words, the users' packing process is monitored to confirm a correctness of the previous step of the optimized order as the user finishes packing a particular item in the packing order according to the step-by-step instructions of the video and triggers the video to display the next step of the optimized order.

In one embodiment, step 104 can use a camera to continuously monitor a state of the luggage bag and accordingly guide the user to pack items. That is, once a step is followed and the item is correctly placed in the luggage bag, step 104 automatically recognize the state of the luggage bag (e.g., because of continuous monitoring using a camera) and shows a step to pack a next item to the user in the video.

Figure 2:
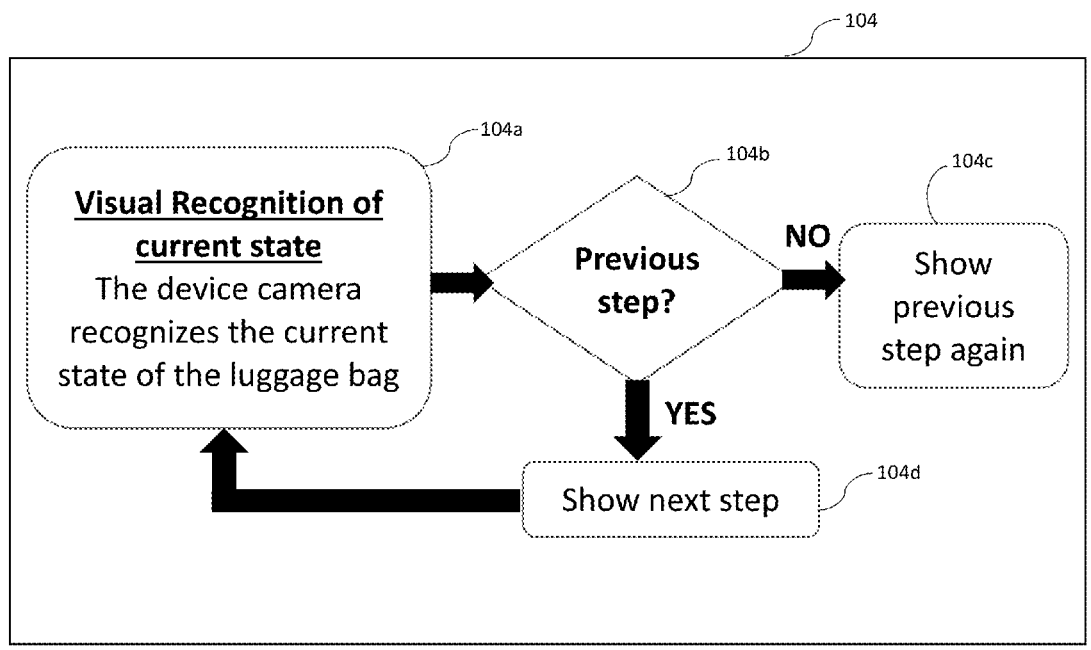
FIG. 2 depicts a second high-level flow chart for the wardrobe packing method according to an embodiment of the present invention.

FIG. 2 depicts a . . . . As depicted, in step 104*a*, the camera recognizes a current state of the luggage bag and step 104*b* determines if the current state matches a state intended at the conclusion of the previous step (e.g., does the item in the luggage bag match the intended packing order). If "NO", the previous step is shown again in the video in step 104*c*. If "YES", the next step in the packing order of the video is shown in step 104*d*. After step 104*d* shows the next step of the video, step 104*a* monitors the luggage bag again to repeat steps 104*a*-104*d* until the step-by-step instructions of the video have been completed correctly.

Figure 3:
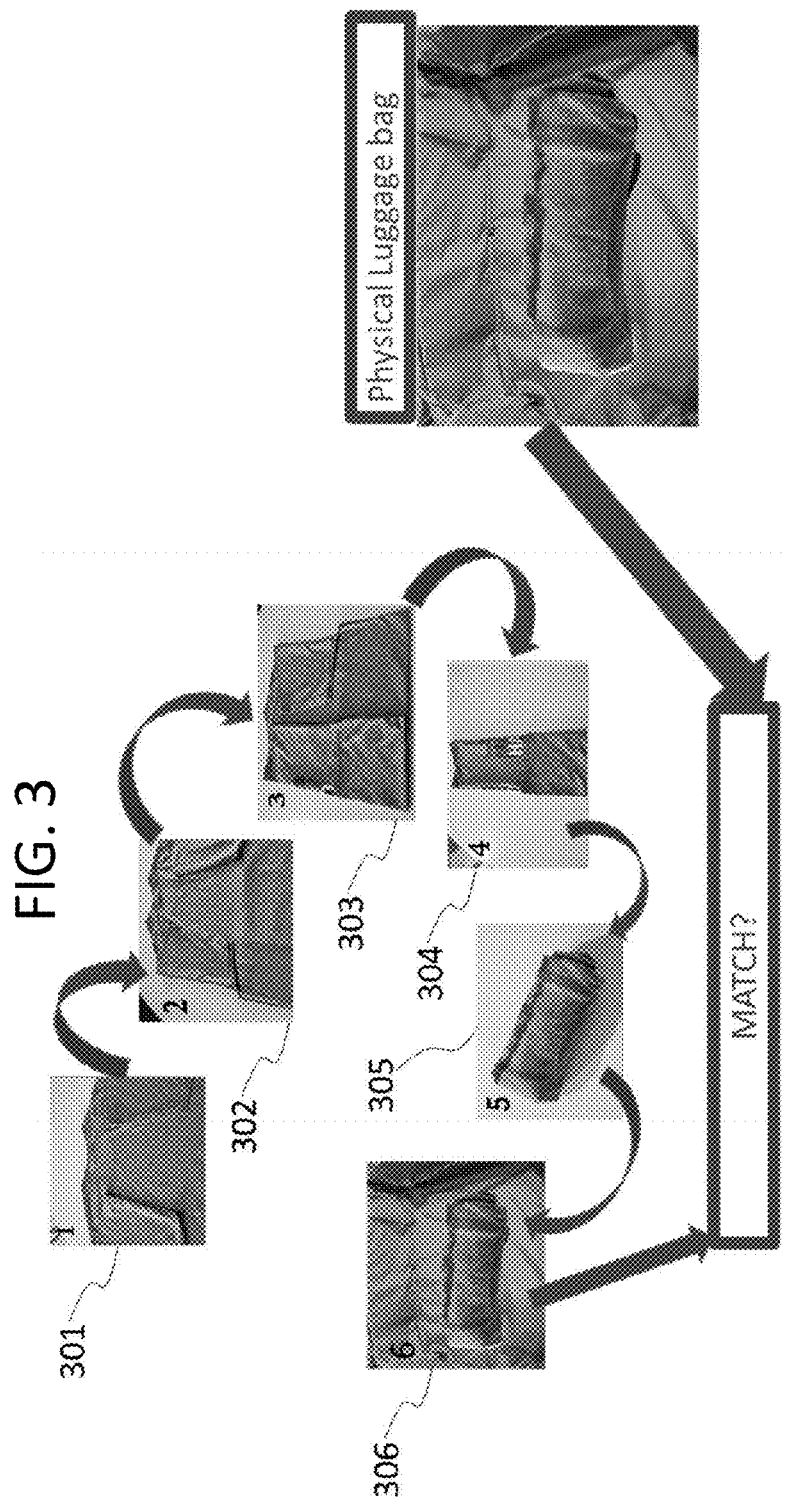
FIG. 3 depicts an exemplary implantation of the wardrobe packing method according to an embodiment of the present invention.

FIG. 3 depicts an exemplary implementation of the method 100. Packing and folding steps 301-306 of FIG. 3 depict a step-by-step instruction of a single instruction to fold a shirt of the interactive augmented video. That is, steps 301-306 are determined in step 103. As the video plays, the user follows steps 301-306 to fold the shirt and place the shirt inside (into) the luggage bag. The current state of the luggage bag is recognized by a camera to determine if the current state of the luggage bag (e.g., where the user placed the item and how the user folded the item) match the intended location of the optimized packing order. If "YES", then the video continues to display the next step until the packing order is complete.

Referring to FIG. 1, in step 105, packing preference data is learned to modify the packing order based on user preference data over time (e.g., user modifying the packing order, packing preference data, etc.) and crowd sourcing from other users.

Crowd sourcing can be performed by a web crawl to learn the item preferences. For example, documents which mention user's experiences with different items while travelling and packing can be mined to learn and update item preferences. For example, if a bottle of cologne broke in the luggage bag and a user blogged about this accident, the data can be mined and that type of cologne can be updated to be packed differently to avoid breaking.

User preferences can be given greater weight than crowd sourcing preferences. However, recommendations may be made to the user based on a user specified crowd sourcing preferences.

That is, by referring to packing habits of other users, in step 105, what type of packing preferences the user has can be learned based on how the preference of an item evolves over the time. In addition, packing habits can be monitored such that item preferences can be learned relating to which particular items to pack based on a location of travel. In one embodiment, if a user is travelling to a new place, using the packing preferences of other users who travelled to that place, some necessary items can be intelligently recommended to be packed.

In one embodiment, an interaction with the augmented packing video can be analyzed to learn whether the packing is done as per the recommendation. If the user deviates from the packing order or steps, item preferences can be learned to reflect the deviations in future packing orders.

In some embodiments, determining one or more optimal dimensions, packing preferences, and priorities of the items to packed can be leveraged through cognitive Internet of Things (IoT)-devices. Thus, optimal packing with improved outcomes is facilitated by an interactive video that demonstrates a step-by-step procedure for effectively packing in one or more scenarios. Some embodiments can also monitor the user's packing (e.g., using a camera) and suggest corrections if the user is deviating from the suggested packing steps in the video.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
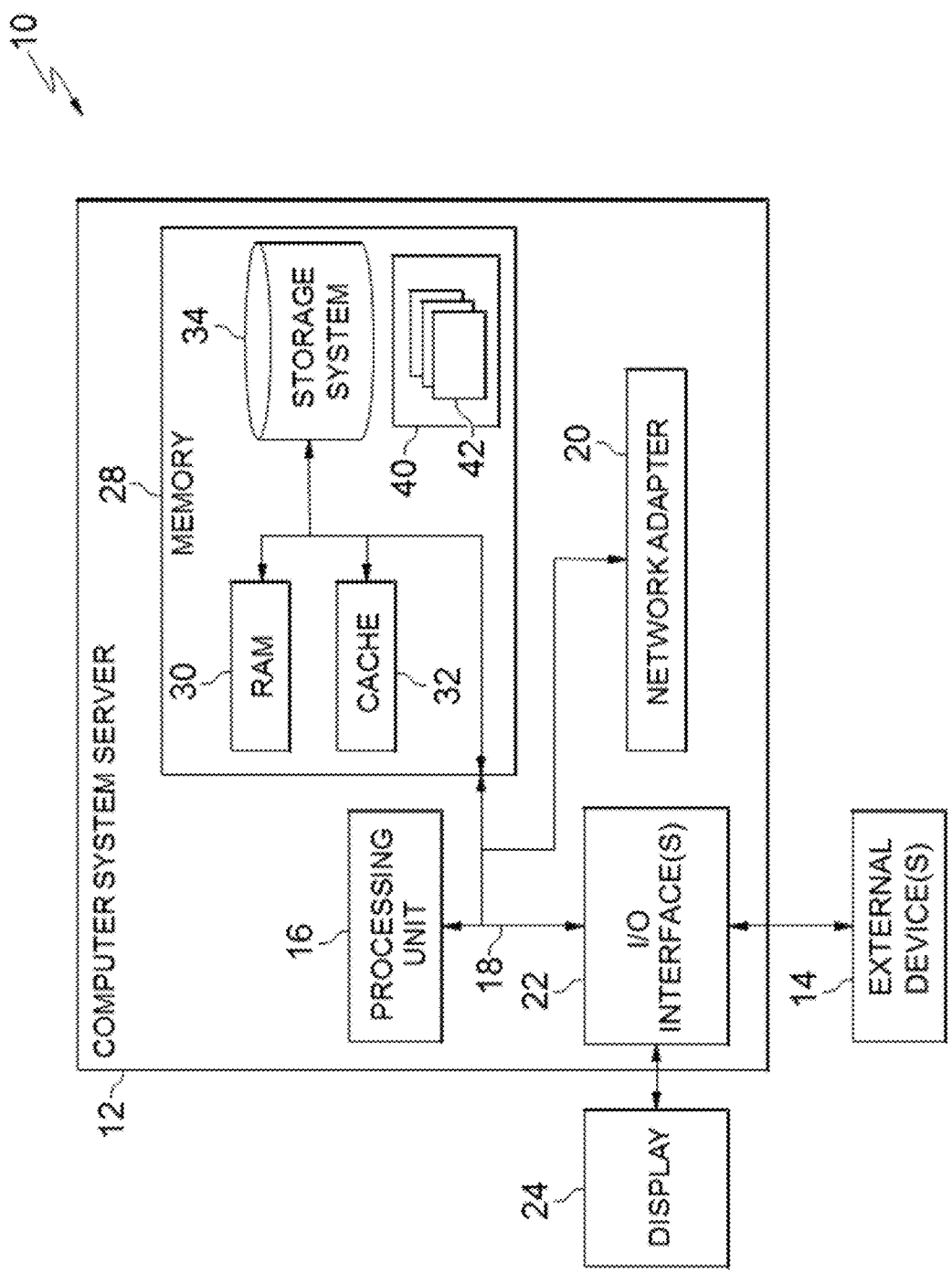
FIG. 4 depicts a cloud computing node according to an embodiment of the present invention.

Referring specifically now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, devices and/or configurations that may be suitable for use with computer system/server 12 include, but are not limited to, client computer systems, computer workstations, other computer servers, thin clients, thick clients, hand-held devices, laptop devices, mobile devices, multiprocessor systems, microprocessor-based systems, set top boxes, consumer electronics, network devices, minicomputer systems, mainframe computer systems, and distributed cloud computing nodes and environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
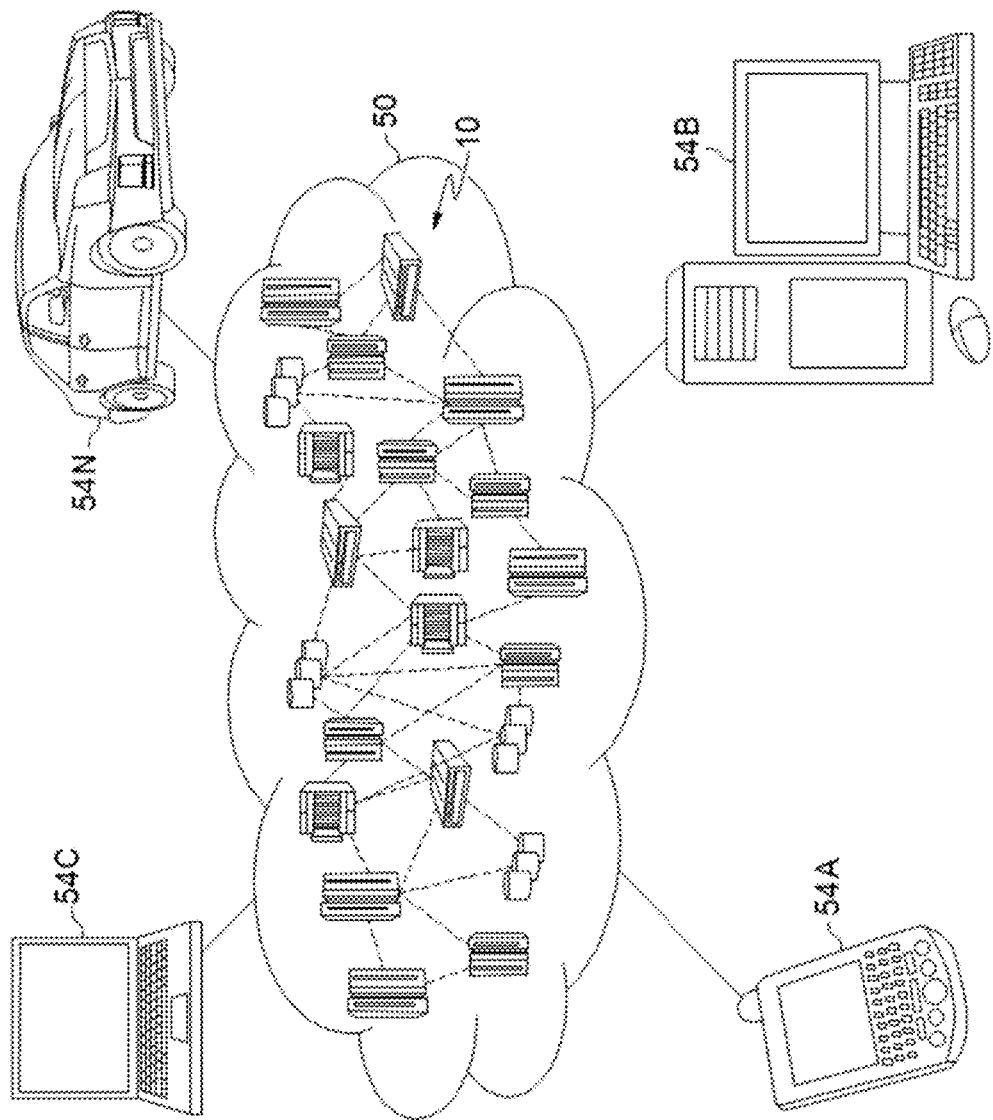
FIG. 5 depicts a cloud computing environment according to an embodiment of the present invention.

FIG. 5 depicts an embodiment of a cloud computing environment in accordance with the present invention. As depicted, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
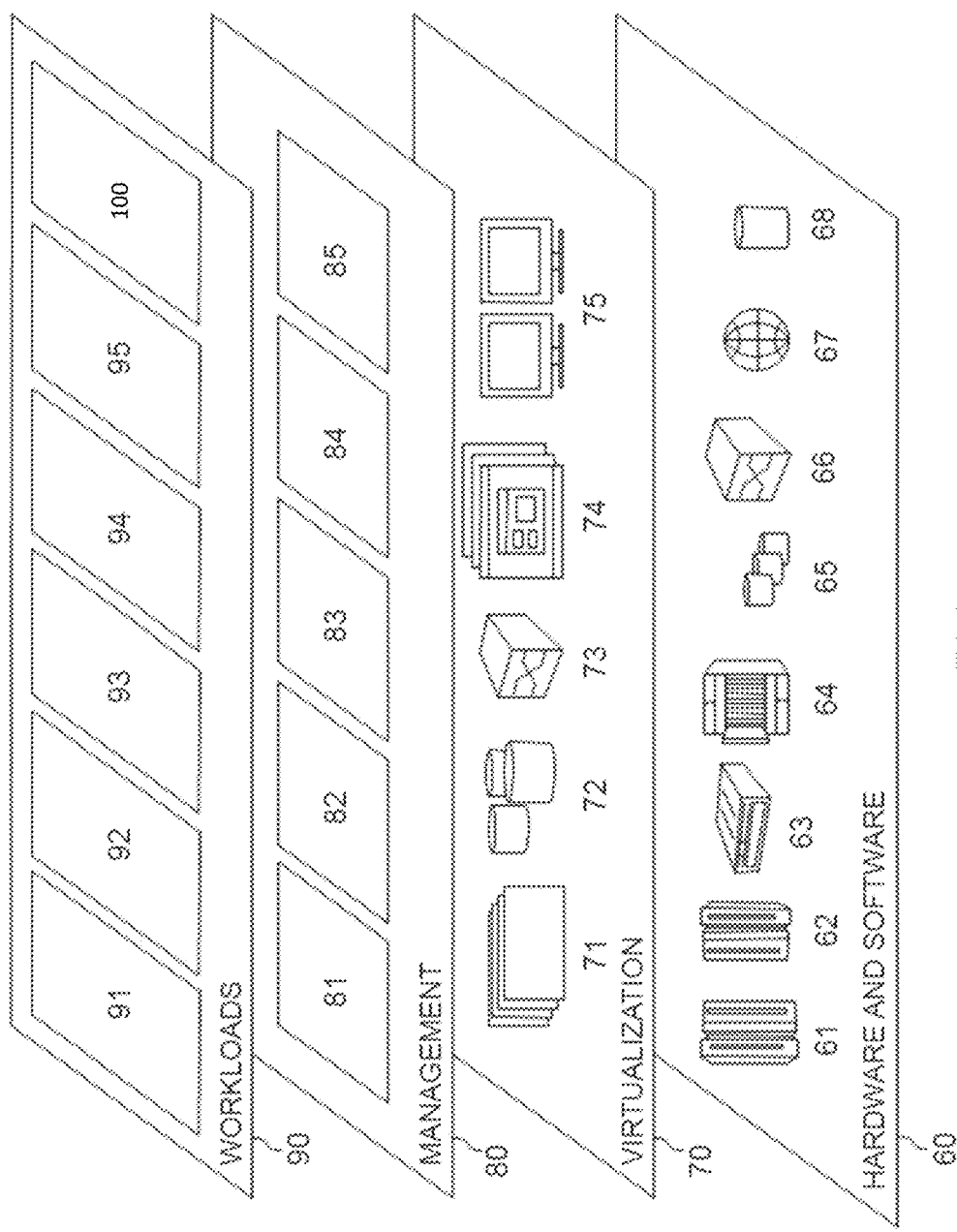
FIG. 6 depicts abstraction model layers according to an embodiment of the present invention.

FIG. 6 depicts an exemplary set of functional abstraction layers provided by the cloud computing environment 50 (FIG. 5). It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to embodiments of the present invention, a packing method and computer program product.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented packing method, the method comprising:
    selecting a plurality of items stored in a memory to pack into a container;
    generating a packing order of the plurality of items based on packing preference data and item data stored in the memory;
    creating and displaying, via a device, an interactive, augmented video that visually shows step-by-step packing instructions for the plurality of items in the packing order;
    monitoring and comparing, via a camera, an actual packing process to a generated packing order to confirm a correctness of a previous step of the step-by-step packing instructions as the previous step is finished for packing a particular item in the packing order according to the step-by-step packing instructions; and
    controlling said displaying of one of a next step of the step-by-step packing instructions and the previous step of the step-by-step packing instructions, in response to said monitoring and comparing, the controlling automatically displays the next step of the optimized order when the correctness of the previous step is confirmed or the controlling automatically displays, again, the previous step of the step-by-step packing instructions when the correction of the previous step is not confirmed,
    wherein the packing preference data includes:
        data for each item of the plurality of items individually to optimize packing space in the container; and
        a feature of each item to optimize a condition of the item based on the feature in the packing space.

2. The method of claim 1, wherein the item data is selected from a group consisting of:
    a dimension of the plurality of items;
    a type of each of the items; and
    a fragility of each of the items, and
    wherein the packing preference data is selected from a group consisting of:
    a preferred location of an item in the container; and
    a preferred condition of the item including a crease or a wrinkle in clothing items.

3. The method of claim 1, wherein the step-by-step packing instructions of the video comprise folding instructions for one or more of the plurality of items in the packing order.

4. The method of claim 1, wherein the packing order is based on a dimension of one or more of the plurality of items correlated with a dimension of the container.

5. The method of claim 1, wherein said monitoring and comparing further comprises:
    determining that the step of the step-by-step packing instructions is correctly completed, based on a location of the item and a preparation of the item matching a location of the item and a preparation of the item in the step-by-step packing instructions; and
    playing the next step of the step-by-step packing instructions, in response to said determining.

6. The method of claim 1, further comprising modifying the packing order based on at least one of a prior packing order, the packing preference data and crowd sourcing data.

7. The method of claim 1, wherein the step-by-step packing instructions of the video comprise a placement for one or more of the plurality of items in the container and folding instructions for one or more of the plurality of items.

8. A computer program product for packing, the computer program product comprising a computer readable storage medium having program instructions embodied therewith, the program instructions executable by a computer to cause the computer to perform:
  selecting a plurality of items stored in a memory to pack into a container;
  generating a packing order of the plurality of items based on packing preference data and item data stored in the memory;
  creating and displaying, via a device, an interactive, augmented video that visually shows step-by-step packing instructions for the plurality of items in the packing order;
  monitoring and comparing, via a camera, an actual packing process to a generated packing order to confirm a correctness of a previous step of the step-by-step packing instructions as the previous step is finished for packing a particular item in the packing order according to the step-by-step packing instructions; and
  controlling said displaying of one of a next step of the step-by-step packing instructions and the previous step of the step-by-step packing instructions, in response to said monitoring and comparing, the controlling automatically displays the next step of the optimized order when the correctness of the previous step is confirmed or the controlling automatically displays, again, the previous of the step-by-step packing instructions when the correction of the previous step is not confirmed,
  wherein the packing preference data includes:
    data for each item of the plurality of items individually to optimize packing space in the container; and
    a feature of each item to optimize a condition of the item based on the feature in the packing space.

9. The computer program product of claim 8, wherein the item data is selected from a group consisting of:
  a dimension of the plurality of items;
  a type of each of the items; and
  a fragility of each of the items, and
  wherein the packing preference data is selected from a group consisting of:
  a preferred location of an item in the container; and
  a preferred condition of the item including a crease or a wrinkle in clothing items.

10. The computer program product of claim 8, wherein the step-by-step packing instructions of the video comprise folding instructions for one or more of the plurality of items in the packing order.

11. The computer program product of claim 8, wherein the packing order is based on a dimension of one or more of the plurality of items correlated with a dimension of the container.

12. The computer program product of claim 8, wherein said monitoring and comparing further comprises:
  determining that the step of the step-by-step packing instructions is correctly completed, based on a location of the item and a preparation of the item matching a location of the item and a preparation of the item in the step-by-step packing instructions; and
  playing the next step of the step-by-step packing instructions, in response to said determining.

13. The computer program product of claim 8, further comprising modifying the packing order based on at least one of a prior packing order, the packing preference data and crowd sourcing data.

14. The computer program product of claim 8, wherein the step-by-step packing instructions of the video comprise a placement for one or more of the plurality of items in the container and folding instructions for one or more of the plurality of items.

15. The computer program product of claim 8, wherein the computer program product is adapted for a cloud-computing environment.

16. A packing system, said system comprising:
  a processor; and
  a memory, the memory storing instructions to cause the processor to:
    select a plurality of items stored in a memory to pack into a container;
    generate a packing order of the plurality of items based on packing preference data and item data stored in the memory;
    create and display, via a device, an interactive, augmented video that visually shows step-by-step packing instructions for the plurality of items in the packing order;
    monitor and compare, via a camera, an actual packing process to a generated packing order to confirm a correctness of step of the step-by-step packing instructions as the previous step is finished for packing a particular item in the packing order according to the step-by-step packing instructions; and
    control said display of one of a next step of the step-by-step packing instructions and the previous step of the step-by-step packing instructions, in response to said monitoring and comparing, the controlling automatically displays the next step of the optimized order when the correctness of the previous step is confirmed or the controlling automatically displays, again, the previous step of the step-by-step packing instructions when the correction of the previous step is not confirmed,
    wherein the packing preference data includes:
      data for each item of the plurality of items individually to optimize packing space in the container; and
      a feature of each item to optimize a condition of the item based on the feature in the packing space.

17. The system of claim 16, wherein the item data comprises:
  a dimension of the plurality of items;
  a type of each of the items; and
  a fragility of each of the items, and
  wherein the packing preference data is selected from a group consisting of:
  a preferred location of an item in the container; and
  a preferred condition of the item including a crease or a wrinkle in clothing items.

18. The system of claim 16, wherein the step-by-step packing instructions of the video comprise folding instructions for one or more of the plurality of items in the packing order.

19. The system of claim 16, wherein the packing order is based on a dimension of one or more of the plurality of items correlated with a dimension of the container.

20. The system of claim 16, embodied in a cloud-computing environment.

* * * * *